United States Patent
Bliss et al.

(10) Patent No.: US 6,576,849 B2
(45) Date of Patent: Jun. 10, 2003

(54) LOAD CELL DIAGNOSTICS AND FAILURE PREDICTION WEIGHING APPARATUS AND PROCESS

(75) Inventors: Doug Bliss, Columbus, OH (US); Craig Stickel, Pickerington, OH (US); James W. Bentz, Cambridge, OH (US)

(73) Assignee: Mettler-Toledo, Inc., Columbus, OH (US)

( * ) Notice: Subject to any disclaimer, the term of this patent is extended or adjusted under 35 U.S.C. 154(b) by 56 days.

(21) Appl. No.: 09/728,638

(22) Filed: Dec. 1, 2000

(65) Prior Publication Data

US 2002/0066602 A1 Jun. 6, 2002

(51) Int. Cl.[7] .............................................. G01G 23/01
(52) U.S. Cl. ...................... 177/25.13; 702/101; 177/50; 177/25.19; 177/199
(58) Field of Search ................................ 702/101, 102, 702/173; 177/25.11, 25.12, 25.13, 25.14, 25.15, 25.19, 50, 199, 200

(56) References Cited

U.S. PATENT DOCUMENTS

| | | | | | |
|---|---|---|---|---|---|
| 4,658,919 A | * | 4/1987 | Nobutsugu | ............... | 177/25.18 |
| 4,691,290 A | * | 9/1987 | Griffen | ..................... | 177/25.13 |
| 4,901,237 A | * | 2/1990 | Hikita et al. | ............. | 177/25.15 |
| 4,909,338 A | * | 3/1990 | Vitunic et al. | ........... | 177/25.14 |
| 5,076,375 A | * | 12/1991 | Dillon et al. | ............ | 177/25.19 |
| 5,174,400 A | * | 12/1992 | Hasegawa et al. | .......... | 177/200 |
| 5,640,334 A | * | 6/1997 | Freeman et al. | ......... | 177/25.13 |
| 5,650,930 A | * | 7/1997 | Hagenbuch | ................. | 702/173 |
| 5,656,799 A | * | 8/1997 | Ramsden et al. | ........ | 177/25.15 |
| 5,780,782 A | * | 7/1998 | O'Dea | ........................ | 177/136 |
| 5,878,376 A | * | 3/1999 | Schurr | ........................ | 702/102 |
| 6,002,090 A | * | 12/1999 | Johnson et al. | ............. | 177/199 |
| 6,046,411 A | * | 4/2000 | Kawanishi et al. | ...... | 177/25.13 |

* cited by examiner

Primary Examiner—Randy Gibson
(74) Attorney, Agent, or Firm—Jeffrey Furr

(57) ABSTRACT

The invention disclosed consists of weighing apparatus and process that includes a new Calibration management utility to automate compliance testing to ISO 9000 requirements and has the "load cell symmetry", "empty platform" and "test load" readings for each load stored on the weighing apparatus. This weighing apparatus makes periodic tests to determine the health of the load cells in the system, producing a log file to record events such as any detected failure, any suspicious reading, overload condition, or any user defined parameter, and is network enabled to be connected through a LAN via an Ethernet to the Internet.

3 Claims, 11 Drawing Sheets

--Prior Art--

# LOAD CELL DIAGNOSTICS AND FAILURE PREDICTION WEIGHING APPARATUS AND PROCESS

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND

1. Field of the Invention

This invention relates to the art of weighing apparatus, and more specifically to weighing apparatus that has designs and methods for load cell failure prediction.

2. Description of Prior Art

Analog load cell systems can fail catastrophically due to lightning, water ingress, or mechanical shock, but more often the failure is by degrees over a period of time. The current method for the prediction of load cell function and prediction of failure involves the need of a service personnel to either visit the site of the weighing apparatus or to ship the weighing apparatus to a service center. This system is expensive, labor-intensive and has the potential for the introduction of errors based on human errors. It may require the weighing apparatus to be unavailable for an unacceptable period of time.

Many weighing applications require the use of multiple load cells in a single scale or in a number of associated scales. For example, a heavy capacity scale for weighing truck or railroad cars requires multiple load cells. Each load cell provides an analog signal proportional to the portion of the load borne by that load cell. Strain gages connected in a wheatstone bridge configuration often provide the analog signal. In heavy capacity applications the load is usually distributed over at least four load cells and some applications may require sixteen or more load cells. The sum of the load cell output signals must be obtained to provide a signal representative of the total load. The usual technique for summing the signals from the analog cells has been to connect the outputs in parallel to provide a single analog output signal representative of the total weight applied to the scale.

The weighing accuracy of multiple load cell scales depends not only on the accuracy of the individual cells but also on the mechanical and electrical interaction among them. Since the load cells usually have different sensitivities to applied loads the total scale output is usually dependent upon the position of the weight on the scale.

U.S. Pat. No. 4,261,195, to Lockery, U.S. Pat. No. 4,574,899 to Griffen and U.S. Pat. No. 4,556,115 to Lockery address the problem of load position compensation in multi-load cell scales.

When the analog circuits of multiple load cells are connected together they are essentially impossible to monitor individually. Thus, "trouble shooting" or "load cell failure prediction" or repair of a scale can require disassembly of the electrical circuits in order to test the load cells individually and find the defective one. Further, when a load cell is replaced for any reason the scale often requires recompensation for load position. A known test weight is required to accomplish this recompensation. For large scales in particular this is a time consuming procedure and the known weight often inconvenient to obtain.

Recently there has appeared the so-called "digital load cell" in which an analog-to-digital converter and microprocessor are dedicated to a single load cell. The electronic circuits are mounted on a printed circuit board connected directly to the load responsive spring element, or counterforce, of the load cell. Temperature, creep and linearity errors of the individual load cell have been compensated by digital techniques. There still is a need to better predict load cell failure.

The failure of a load cell in a weighing apparatus can cause a company to lose money and goodwill due to downtime and possible inaccurate readings, being able to predict this failure and to plan around it would be extremely valuable. ISO 9000 adds the need to store critical data such as weighing instrument calibration and to be able to track performance data.

The need for scales that automate compliance testing to ISO 9000 requirements while having better and more efficient load cell diagnostics and failure predictions shows that there is still room for improvement in the art.

1. Field of the Invention
   U.S. Class 177-25.11
2. Description of related art including information disclosed under 37 CFR § 1.97**> and 1.98<.

SUMMARY OF THE INVENTION

An object of the present invention is to provide a better and more efficient method to predict potential load cell failures and meet ISO 9000 requirements for weighing apparatus.

The weighing apparatus and process, according to one aspect of the present invention, includes a new junction box that contains multiple A/D PCBs (each handling one analog load cell), a new Calibration management utility to meet ISO 9000 requirements, and has the "load cell symmetry", "empty platform" and "test load" readings for each load cell stored on the weighing apparatus. This weighing apparatus makes periodic tests to determine the health of the load cells in the system, producing a log file to record events such as any detected failure, suspicious reading, overload condition, or any user defined parameter, and is network enabled to be connected through a LAN via an Ethernet to the Internet.

It is a general object of the present invention to substantially eliminate the problems described above associated with prediction of load cell failures in multiple load cell weighing apparatus. A further object is to provide compensation for load position and other errors in multiple load cell scales in which the analog portions of the load cells remain isolated.

The current invention has the use of an A/D converter for each load cell in a multiple load cell scale. It can be used with multiple digital load cells. It also includes a new junction box that contains four (4) A/D PCBs, each handling one analog load cell, which can connect through a standard POWERCELL type network or some other arrangement.

During calibration, the "empty platform" and "test load" readings for each load cell are stored in the instrument. The load cell symmetries, if any, existing in the system must also be stored in the instrument. For example, a vehicle or railroad track scale has left-right loading symmetry along the longitudinal axis; a tank scale could have radial symmetry; a floor scale or monorail scale usually has little or no symmetry.

A new Calibration Management Utility program is run at periodic intervals by the user or service personnel. This utility is primarily intended to help users meet ISO 9000 requirements for tractability of instrument calibration, with differences between actual and expected individual scale readings being flagged by the instrument and reported to the user as "OK", "Marginal", or "Bad". The Calibration Management Utility program can also be used to send messages when the scale needs to be audited manually, based on a decision event or criteria such as the number of weighing cycles or the passage of time.

As the weighing scale is operated, the instrument automatically makes periodic tests to determine the health of the load cells in the system. This includes examination of the load cell readings when the scale is "empty", as indicated by the operator request to zero the scale. It also includes a "sanity check" which looks at all of the load cells in the system and, knowing something about the symmetry of the scale and from past experience, it looks for any single load cell with a reading that is out of sync as compared to other load cell readings. Any error condition is analyzed.

A log file is employed to record "events". An event is any detected failure, any suspicious reading, overload condition, or anything that has been defined to the system. The event log can be examined on command.

The weighing apparatus is network enabled. This means that there is connection to a customer LAN via Ethernet and to the Internet. There is also provision for a dial up modem connection to the Internet. The weighing apparatus can compose and send an email message to any designated party (e.g., a local service office) indicating that there is a problem or that the scale needs to be audited and indicate the urgency, either immediate or future. The network connection also permits remote access to the weighing apparatus, across a LAN or the Internet, which includes the ability to examine the event log, adjust settings, or just operate the instrument.

Analog load cell systems can fail catastrophically due to lightning, water ingress, or mechanical shock, but more often the failure is by degrees over a period of time. The most commonly used diagnostic of either current or impending failure is a shift in load cell output. This is done by periodically recording the load cell output when the scale is known to be empty and the output given a known test load, then comparing the readings to the values established when the scale was installed to make a determination about the health of the system.

Load cell output testing at no load condition (zero test) can be automated if the scale system periodically returns to a no load state. Hopper scales may confound the "empty" condition test by accumulating material on the hopper surfaces. At odd intervals the material either falls away naturally, or an operator pounds the side of the hopper to force the issue. In cases such as storage tanks, the scale may never achieve a no load state.

Data can be obtained from individual load cells, so that each can be diagnosed and replaced if necessary without the need for disconnecting and reconnecting the entire scale or multi-load cell assembly. The diagnosis can be handled from a remote location by connection of a computer to the master controller through telephone lines and modems.

If the system consists of multiple load cells, each having a dedicated A/D channel, it may be possible to infer additional diagnostic information, depending on the known symmetries of the system. The following symmetry cases should be considered.

No symmetry—A floor scale or an overhead monorail scale are good examples. A load could be placed at any location. Any single cell could see all, some, or none of the load for any given weighment.

Left-right symmetry—A railroad track scale or (sometimes) a vehicle scale are good examples. The scale is made using two or more pairs of load cells. Each cell of a pair usually sees the same loading pattern.

Radial symmetry—Cylindrical tank or hopper scales often have identical net weight loading on all load cells, though they sometimes have an off center dead load due to the mounting of the discharge feeder machinery. This symmetry is especially useful if liquid materials are being weighed.

Multiple load cell scale systems having known symmetries can cross check the health of the load cells. Each cell could compute the likely reading of the other cells within the symmetry. If the readings do not match (within a tolerance), a fault condition is likely. If there are more than two cells in the symmetry, the most likely to be faulty cell can be selected by voting.

A maintenance log file must be separate from an event log for use by Weights and Measures. As example of some things to log or count in the maintenance log file are as follows:

1. Overload—log all instances of a cell (or platform) being loaded above a preset static load limit.
2. Impact—log all occurrences of high impact loading (derivative exceeds preset limit AND overload exceeds present limit)
3. Weighment counter
4. Zero command counter
5. Zero command failure counter—used in conjunction with the Zero command counter.

The method for automated load cell failure prediction as specified above is more efficient, effective, accurate and functional than the current art.

BRIEF DESCRIPTION OF THE DRAWINGS

Without restricting the full scope of this invention, the preferred form of this invention is illustrated in the following drawings.

DESCRIPTION

Preferred Embodiment

The preferred embodiment of the invention is a weighing apparatus which has the capability to perform diagnostics and communication data including load cell failure prediction. While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
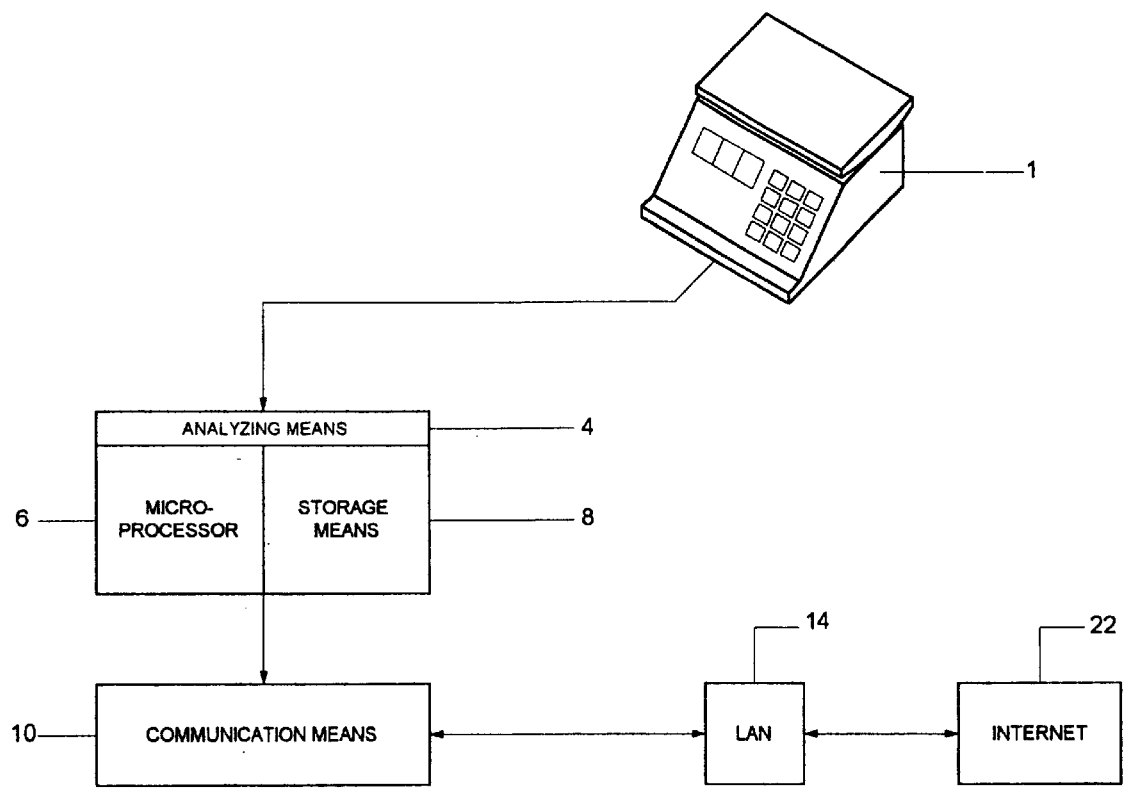
FIG. 1 is a plan view of a weighing apparatus embodying the present invention.

Weighing apparatus 1 are well known in the art and are shown configured for the current invention in FIG. 1. It is connected either internally or externally to the analyzing means 4 which includes a microprocessor 6 and a storage unit 8 in which are stored the specific data which are characteristic of the weighing apparatus 1. The weighing apparatus 1 includes a communications means 10, which is used to connect the weighing apparatus 1 to an internal LAN 14. In the preferred embodiment, the weighing apparatus 1 connects to the Internet 22 either directly or through a LAN 14.

Figure 2:
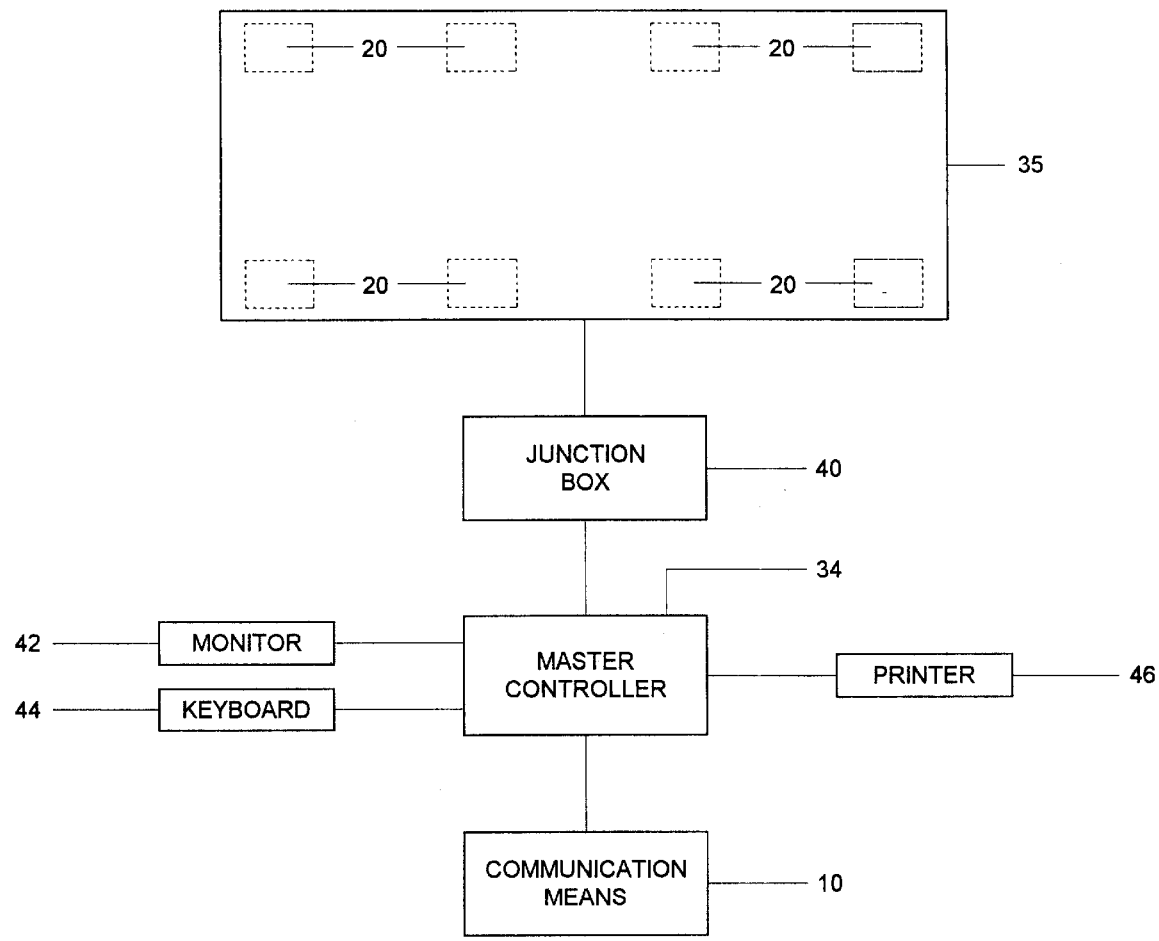
FIG. 2 is a plan view of a multiple load cell weighing apparatus.

Referring to FIG. 2, there is shown a weighing apparatus 1 configured as a single scale for weighing vehicles with a left/right load cell symmetry. The system includes eight digital load cells 20 supporting a platform 35. The load cells 20 are connected together through a junction box 40 to a master controller 34. The master controller 34 may be connected to one or more peripheral devices 46 such as a printer or host computer. The master controller 34 may be connected to a monitor 42 and keyboard 44 and a communication means 10.

The connection of the digital load cells 20 to each other and to master controller 34 through a bus 51 provides the basis for a LAN, or local area network, in which communication can occur between the individual load cells 20 and master controller 34. Alternatively, each digital load cell 20 could be connected individually to master controller 34. The LAN, however, is preferred.

In the LAN, master controller 34 acts as the master and the individual load cells 20 as slaves incapable of initiating communication with the master controller 34. Preferably, the LAN 14 utilizes the Intel BITBUS communication system. Master controller 34 polls the load cells 20 (slaves) or selected load cells 20 as required. The load cells 20 respond by transmitting data or requesting information from the master controller 34.

Figure 3A:
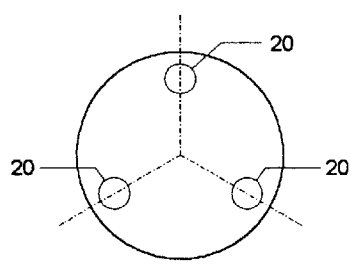
FIGS. 3a, 3b, 3c, and 3d shows different possible load cell symmetries in a weighing apparatus.
Figure 3B:
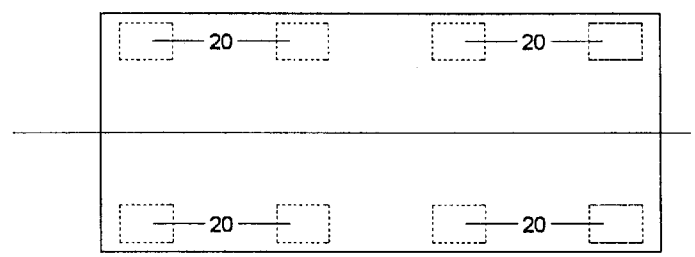
Figure 3C:
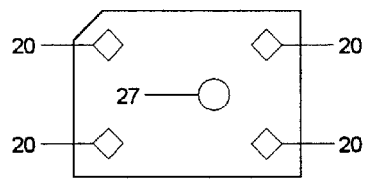
Figure 3D:
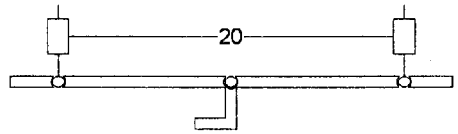

FIGS. 3a, 3b, 3c, and 3d demonstrates some of the potential and typical symmetries and non-symmetries that different weighing apparatus may have. FIG. 3a shows a radial symmetry where the load cells are located around a radius. The type of weighing devices that use this type of symmetry are bin scales. Cylindrical tank or hopper scales often have identical net weight loading on all load cells, though they sometimes have an off center dead load due to the mounting of the discharge feeder machinery. This symmetry is especially useful if liquid materials are being weighed. FIG. 3b dimensions a left/right symmetry. A railroad track scale or (sometimes) a vehicle scale are good examples. The scale is made using two or more pairs of load cells. Each cell of a pair usually sees the same loading pattern. FIG. 3c shows a non-symmetric weighing device where there is a weight 27 that is not centered on the weighing platform. It is a floor scale, with a load cell located in each corner. A load could be placed at any location weight. Any single cell could see all, some, or none of the load for any given weighment. FIG. 3d shows an overhead monorail scale which is a non-symmetric weighing device that has numerous load cells weighing a load hanging on a rail. The load has the potential to move across the rail. This movement produces the non-symmetry.

In the arrangement of FIG. 2, one or more digital load cells may constitute an individual scale so that the combined output of all load cells in the group represents relevant weight data to be gathered and operated on by master controller 34. An example of such an application would be the assignment of each group to weigh one particular tank or storage bin of many receiving and discharging material. The status and amount of material delivered by each tank or bin could then be monitored and controlled through master controller 34. In another application, all of the load cells 20 could be in the same scale, for example distributed at selected points beneath the platform of a vehicle scale or other scale utilizing a platform for weighing.

In the case of a single scale, master controller 34 polls all load cells periodically and sums the weight data to obtain the weight of the object on the platform. In the case of multiple scales, the system deals with only one scale at a time, as during a transfer of material into or out of the tank or bin or periodically to inventory the material remaining in the tank or bin. Master controller 34 need poll only the load cells of the particular scale and only when required.

Figure 4:
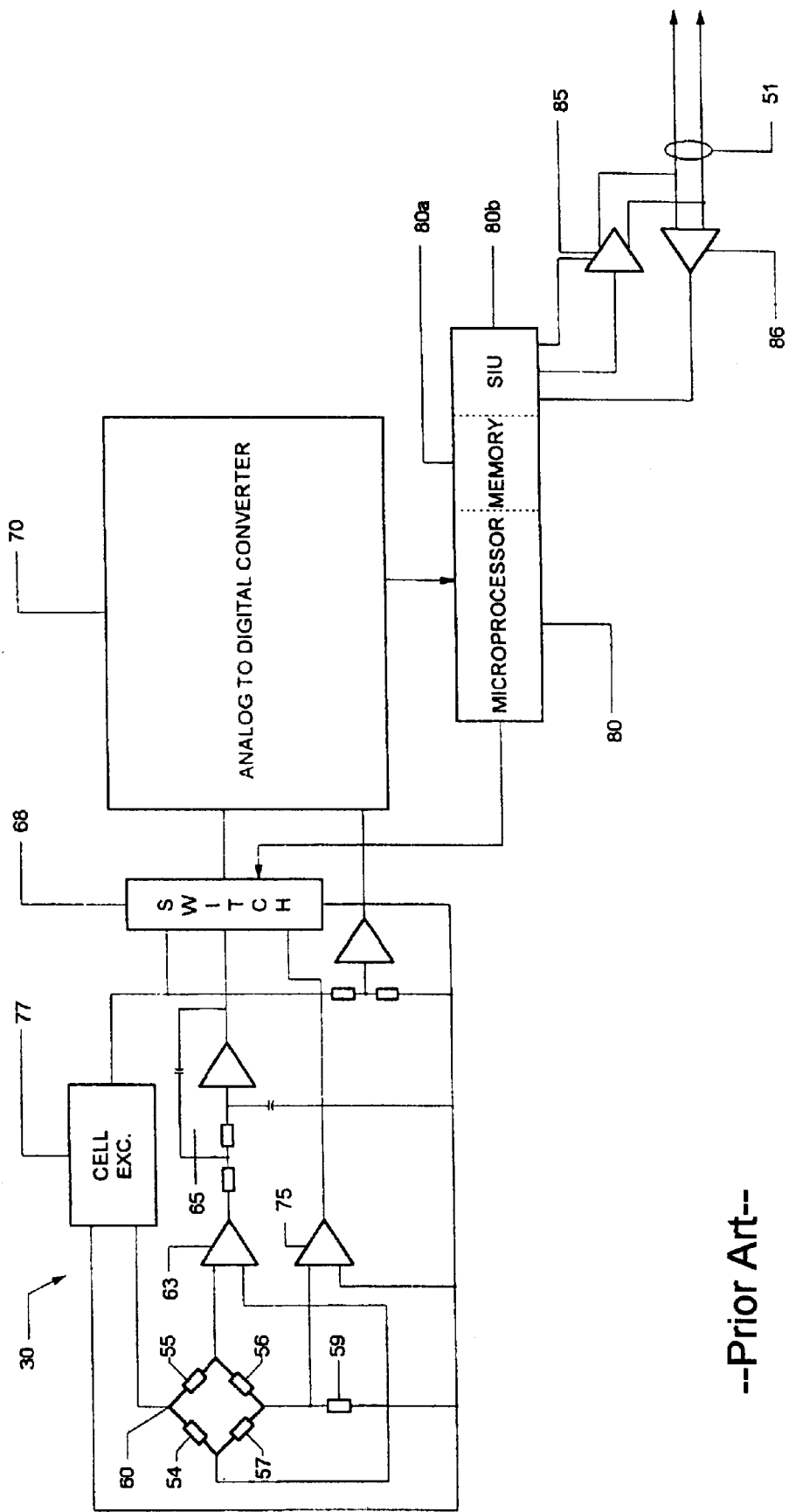
FIG. 4 shows the typical wheatstone bridge load cell configuration with an A/D converter.

The electrical circuit of the digital load cell 20 of FIGS. 2 and 3, as shown in FIG. 4, strain gages 54 to 57 are connected in the electrical bridge circuit 60 which provides a weight signal to a preamplifier 63. The weight signal from preamplifier 63 is coupled through an analog filter 65 to one input of an analog switch 68. The output of analog switch 68 is connected to the input of a multiple slope analog-to-digital (A/D) converter 70. Nickel resistor 59 is connected in series with bridge circuit 60 and provides a signal through a preamplifier 75 to another input of analog switch 68. Excitation is provided to bridge circuit 60 by a power supply 77, which also provides a known reference voltage through analog switch 68 to multiple slope AID 70. The output of A/D converter 70 is connected to a microprocessor 80, preferably an Intel 8051. Microprocessor 80 controls the operation of analog switch 68 to cause analog weight signals from bridge 60 and temperature indicating signals from nickel resistor 59 to be converted to digital form by A/D converter 70 and transmitted to Microprocessor 80.

Microprocessor 80 is provided with memory 80a including ROM, EEPROM and RAM for storage of programs and of data received from A/D converter 70 and from master controller 34. Microprocessor 80 is also equipped with a serial interface unit 80b connected through a driver 85 and a receiver 86 to bus 51 for communication with master controller 34. In the preferred embodiment, the current invention includes a new junction box that contains multiple A/D PCBs, each handling one analog load cell, which is connected on a standard POWERCELL type network to the master controller 34.

Each of the digital load cells illustrated in FIGS. 2 and 3 is programmed to operate as a slave to the master controller 34 and to respond to commands directed to it. Each load cell has a unique address stored in local memory, which allows the master controller to send commands to it only.

Figure 5:
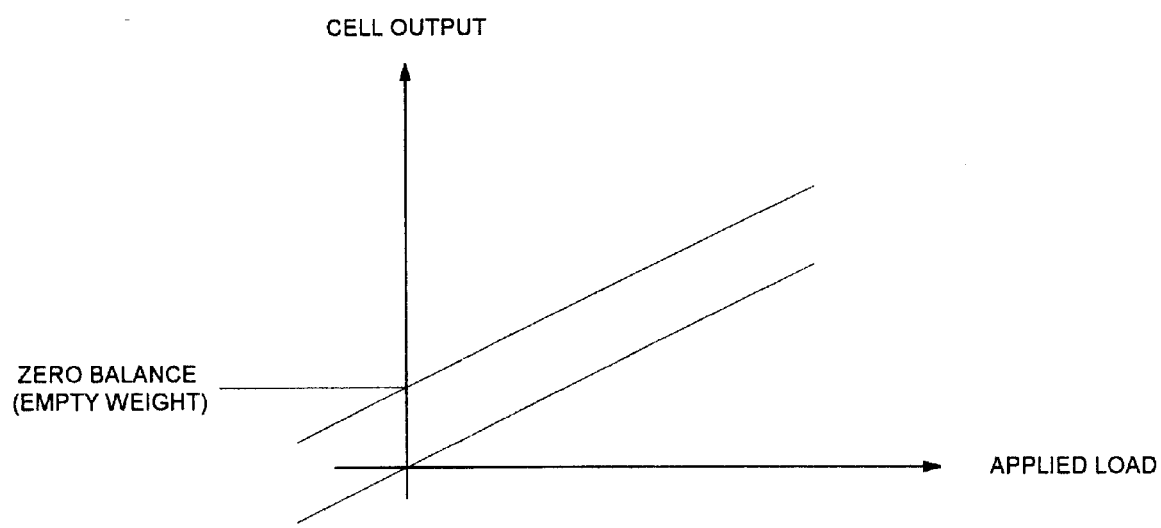
FIG. 5 shows a graph of the load cell prediction model.

FIG. 5 is a graph that helps to show how a load cell failure is predicted. The top line designates the equation of the increase in load cell output as the applied load increases. The second line designates the equation of the increase in load cell output as the applied load increases that has been adjusted for the zero balance empty weight. When the zero balance and the applied load versus load cell output starts to shift it is an indication that a load cell failure is predicted. Since the weighing apparatus has access to the initial system information for each of the load cell the system will be able to know which load cell has the anticipated failure and can electronically adjust for it.

According to prior art, a multiple load cell scale is corrected digitally for load position errors. In the scale of FIG. 2, when the same weight is placed at the same spot on platform 35 at different times the weight signals from the individual load cells 20 will be the same. When, however, the weight is placed in a different position on the platform the digital signals from the load cells (and their sum) may increase, decrease or remain the same according to the new position of the weight. In accordance with the present invention, these digital signals are modified so that the sum of the modified signals representing the weight on platform 35 remains substantially the same for different positions of the same weight on the platform.

The total weight, B, on platform 35 can be represented as:

$B = A_1 + A_2 + A_3 + \cdots + A_N$ where N is the number of load cells in the scale, and $A_j$ are the digital weight readings from the individual load cells.

The total weight on platform 35 corrected for load position can be represented by $$B_c = A_1 X_1 + A_2 X_2 + A_3 X_3 + \cdots + A_N X_N \quad (1)$$

where $B_c$ is the total weight corrected for load position, $X_j$ are constant load position correction factors for the individual load cells.

When the values of the load position correction factors, $X_j$, are known for the individual load cells they can be stored at the master controller 34 and used during operation to correct the load cell weight readings for load position.

The values of the coefficients $X_j$ for the individual load cells may be determined during calibration and set-up of the scale. The values of the coefficients may be determined utilizing equation (1) above and weight readings taken from each of the load cells with the same test weight placed at various positions on platform 35. For a scale having N load cells the same weight is placed sequentially at each of N positions on platform 35 (FIGS. 5, 6) and weight readings taken from each load cell at each position. The resulting data can be utilized to construct N equations of the form of equation (1) above in N unknowns, one equation for each position of the weight on platform 35. In each of the equations, $A_j$ are the weight readings from the N load cells with the test weight at the same position and $X_j$ are the unknown values of the constant coefficients. $B_c$ could be set equal to the value of the test weight.

Figure 6:
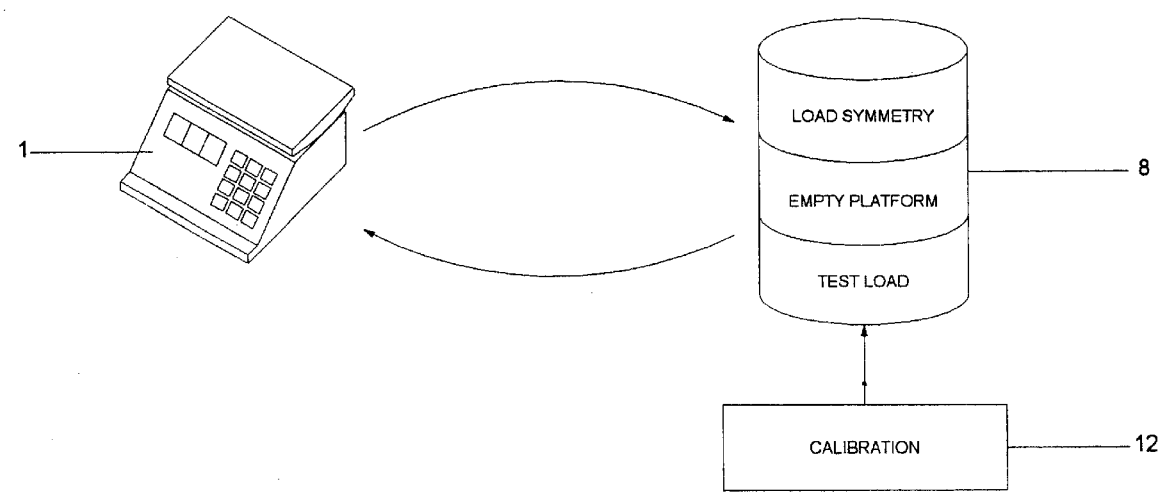
FIG. 6 shows a simple layout of the storage means.

As shown in FIG. 6, during the Calibration Process 12 the weighing apparatus's 1 load cell symmetry, the empty platform load cell output and the initial test load weight is stored in the storage means. This information is stored for future use in load failure prediction and used by the Calibration management utility program, which is a program for tractability of instrument calibration and diagnostics. It examines any differences between actual and expected scale reading which are flagged by the weighing apparatus 1 and reported to the user as "OK", "Marginal", or "Bad".

The storage means can be any industry electronic standard storage device or method. It can be a combination of ROM, RAM and EEPROM. EDO DRAM can also be used.

As the weighing device 1 is operated, it automatically makes periodic tests to determine the health of the load cells in the system. This includes the examination of the load cell readings when the scale "empty", as indicated by the operator request to zero the scale. The system will also have a "sanity check" which looks at all of the load cells in the system, and knowing something about the symmetry of the scale and from past stored comparisons and information, the system looks for any single load cell with a reading that is not in sync with prior readings and with other load cells and their expected values.

During set up the system is calibrated for zero and span. Calibration values obtained in the process are stored in memory at the master controller for use in weighing operations.

Figure 7A:
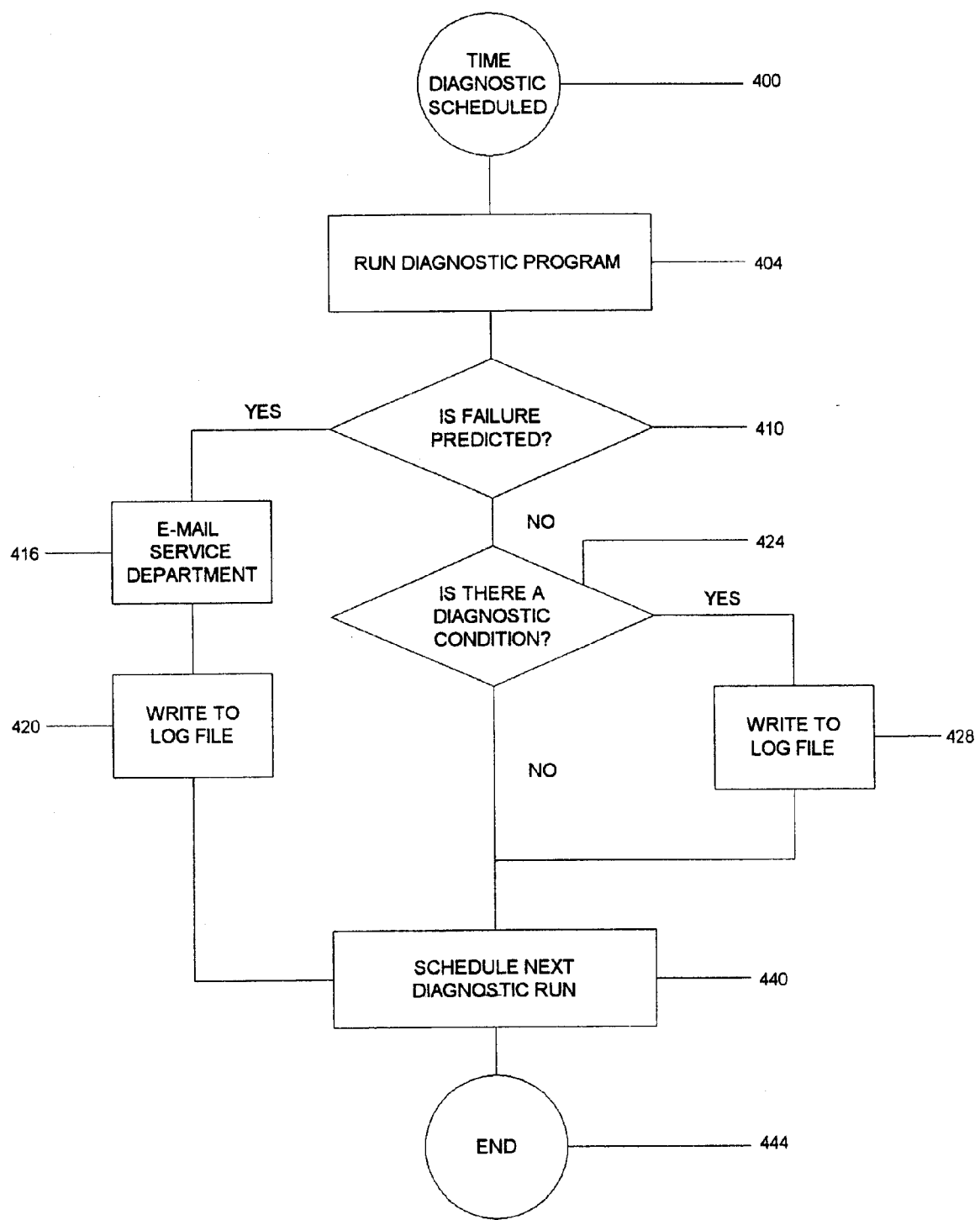
FIGS. 7A and 7B shows the process flow diagram for the getting and retrieving of information from the Internet dynamically when the weight on the scale changes.
Figure 7B:
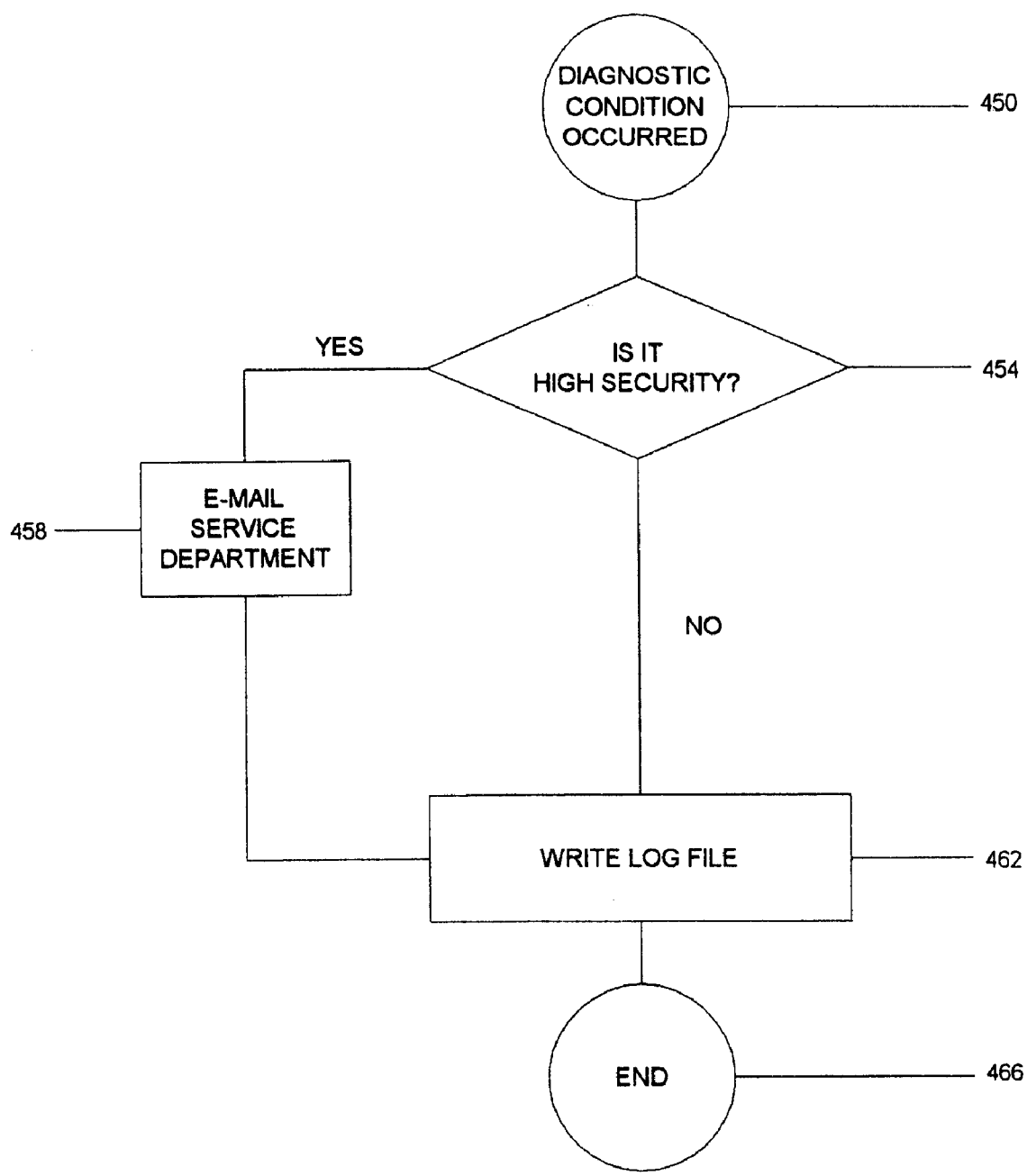

The flow charts in FIGS. 7A and 7B illustrate a sample type operation of the Calibration Management Utility program. This is an example and should not limit the scope and breath of the patent. Initiation point is block 400 is a periodic time that the diagnostic calibration program is scheduled. Block 404 runs the Diagnostic program on the weighing apparatus 1. The program performs a "sanity check", knowing the symmetry of the scale and from past stored comparisons and information, the system looks for any single load cell with a reading that is not in sync with prior readings and with other load cells and their expected values.

Decision point 410 checks the results of the analysis to see if a load cell failure is predicted.

If a failure is predicted, Block 416 sends a notification that a load cell failure is predicted. In the preferred embodiment, this notification is to a service department. Block 420 writes this information to the log file 16. A standard ASCII format is used to write to the log file 16. The log file 16 will contain the time and date of the failure and a code signifying that a failure is predicted and that the service center has been contacted. Block 440 schedules the next time for the calibration management utility to be run. Block 444 ends the process.

If a failure is not predicted, decision point 424 asks if there is an unusual or unordinary or predefined condition present. If there is, Block 428 writes the time and date of the failure and a code signifying what the condition is to the log file 16. Block 440 schedules the next time for the calibration management utility to be run next. Block 444 ends the process.

FIG. 7B gives the flowchart of a situation in which a diagnostic situation occurs that triggers the Calibration Management Utility program. Block 450 is the initial step in which a diagnostic condition or "event" occurs. This event could be any suspicious reading, overload condition, or anything that the user or installer has defined to the system. Block 454 is a decision block in which it is asked if the "event" has been designated as a high severity event. If it is a high severity event, then Block 458 sends a notification that the event occured. In the preferred embodiment, this notification is to a service department. Block 462 writes the event information to the log file 16. Block 466 is the end of this flow process.

The Calibration Management Utility can be used to indicate that the scale needs to be audited manually, based on a decision event such as a number of weighing cycles or the passage of time. It can notify correct person(s) or a service department through the communication means when this service is due.

Figure 8:
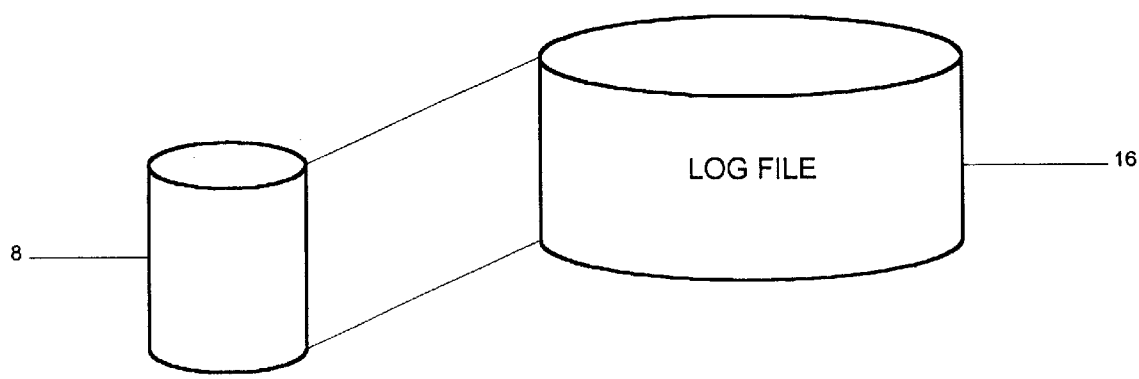
FIG. 8 shows the Log file.

The log file 16, as shown in FIG. 8, is a file in the storage means 8 that maintains a history of the diagnostic readings of the weighing apparatus 1. This information can be written in any format but the preferred embodiment writes this information to the log file 16 in a standard ASCII format. The log file 16 will contain the time and date of the failure and a code signifying why the log entry was written. The log file 16 may also contain some background information such as the cell output of each of the load cells, which of the load cells caused the event and the applied load.

In the preferred embodiment, a service repairman or technician would be able to see what gets logged and how often it gets added to an event log file 16. Access to the maintenance log file 16 printout should require a password or other protection, but should not require the breaking of a metrological seal. A service repairman or technician should be able to access the log file 16 through the Internet 22.

Some things to log or count in the log file 16 are as follows:

1. Overload—could log all instances of a cell (or platform) being loaded above a preset static load limit.
2. Impact—log all occurrences of high impact loading (derivative exceeds preset limit AND overload exceeds present limit).
3. Weighment counter—triggered by print command.
4. Zero command counter.
5. Zero command failure counter—used in conjunction with the Zero command counter.

Additional Embodiments

One additional embodiment is to have the weighing device 1 connect to the LAN 14 via an internal wireless modem. This embodiment has the LAN 14 having a wireless modem as well to receive the information from the weighing device 1 or multiply weighing devices 1.

Another embodiment is to have a dial up modem connection to the Internet 22.

Yet another additional embodiment is to have the storage means 8 contained on the LAN 14.

Yet another additional embodiment is to use an Intranet environment instead of, or in tandem with, the Internet 22. An internal service department could also be used instead of an external service department, which would be contacted via the LAN 14.

Operation

Figure 9:
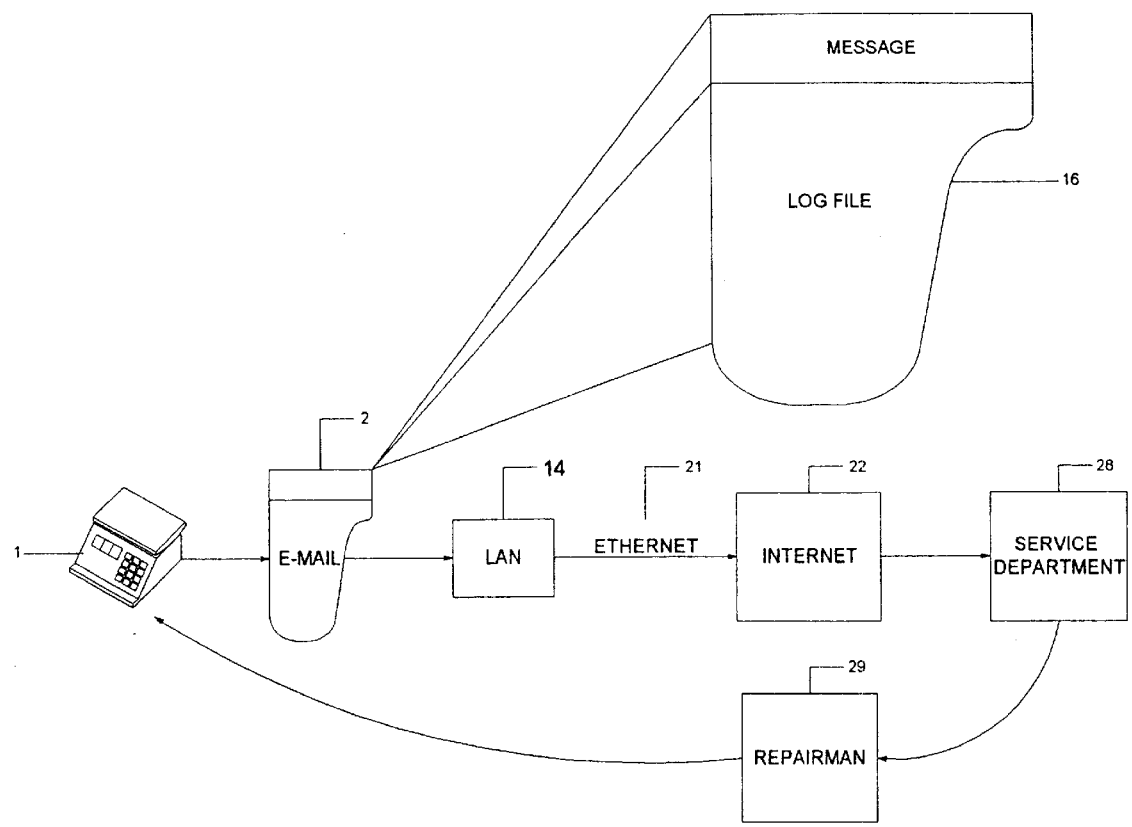
FIG. 9 shows a scale that connects to Internet via a LAN.
Figure 10:
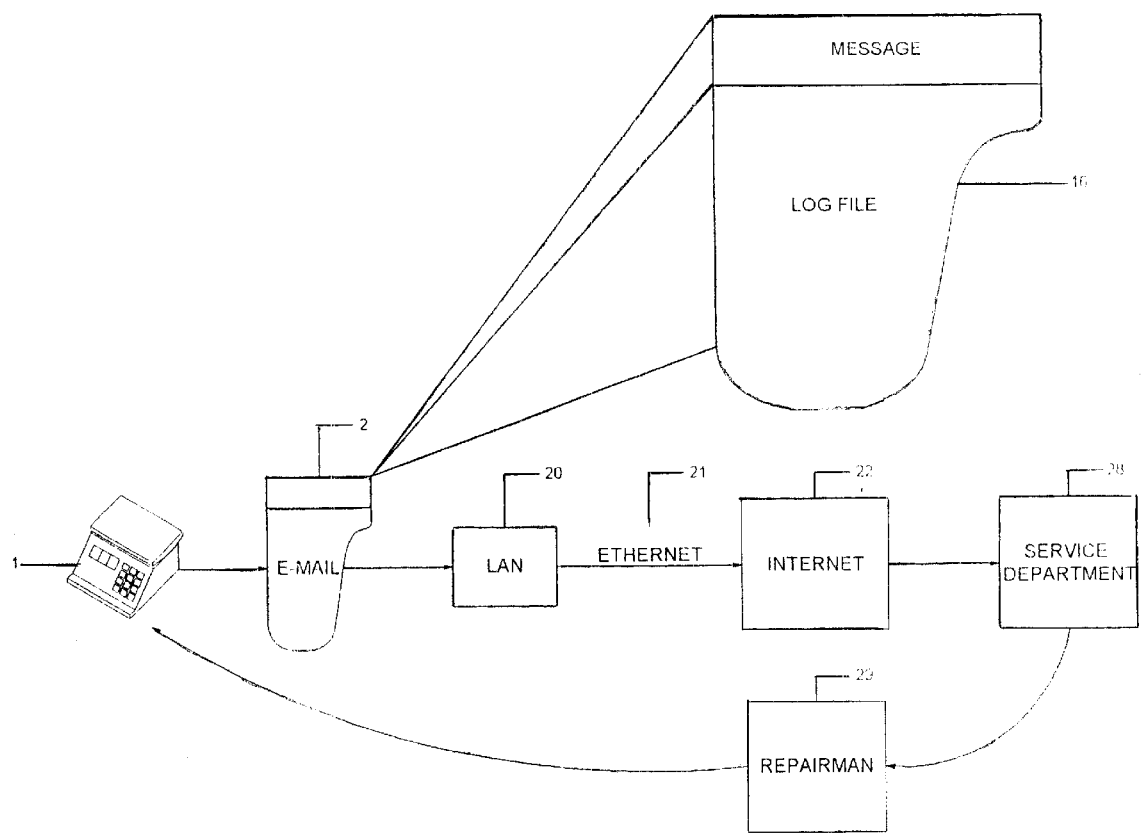
FIG. 10 shows how E-mail is sent through the Internet.

As shown in FIG. 9, the weighing apparatus 1 is network enabled. If a load cell failure is predicted or if a severe problem is detected, the system will send an E-Mail 2 through the LAN 14 using an Ethernet 21 to connect to the Internet 22 to the Service Department 28. The E-Mail 2 message will contain an error message and the pertinent log file entries. A message to any designated party (e.g., a local service office) will state that there is a problem, and indicate the urgency—either immediate or future. The Service Department 28 will contact the user of the weighing apparatus 1 or send a repairman 29 to replace the load cell that is predicted to fail. The repairman 29 will re-calibrate the weighing device 1 for the new load cell. In the preferred embodiment, the Service Center 28 will access the historical log file 16 for better service. This is the same process is followed when manual audits are required based on a decision criteria or event such as the number of weighing cycles or the passage of time.

ADVANTAGES

The previously described version of the present invention has many advantages, such as reduction in the costs and better load cell failure prediction which allows a faster, less expensive, less labor intensive, and more efficient method of load cell failure prediction with less down time. This will greatly lessen the impact on load cell failures or problems on the users of these weighing apparatus. It also automates ISO 9000 requirements for tractability of instrument calibration.

Although the present invention has been described in considerable detail with reference to certain preferred versions thereof, other versions are possible. For example, different type of means used to acquire data from a control device from a load cell, different events could be used to trigger the sending of an E-Mail to the Service Department, different protocols or data formats could be used, different types of information may be communicated or a different type of storage means could be used. Therefore, the point and scope of the appended claims should not be limited to the description of the preferred versions contained herein.

That which is claimed:

1. Weighing apparatus comprising a single or plurality of load cells, means associated with said load cells for analyzing diagnostic events, means for storing information and where a message is sent based on the severity on the event.

2. Weighing apparatus comprising a single or plurality of load cells, means associated with said load cells for analyzing diagnostic events, means for storing information and where a message is sent based on the severity on the event via an E-mail.

3. A method for analyzing a single or multiple load cell scale for diagnostic events, said scale including means for analyzing the load cells for such events, and including the steps of polling the load cells, retrieving historic data from storage means and comparing the results with historic data, and sending a message based on the severity on the event.

* * * * *